United States Patent
Li et al.

(10) Patent No.: US 9,341,883 B2
(45) Date of Patent: May 17, 2016

(54) DISPLAY MODULE AND LIGHT GUIDE DEVICE

(71) Applicant: Himax Display, Inc., Tainan (TW)

(72) Inventors: Yuet-Wing Li, Tainan (TW); Kuan-Yu Chen, Tainan (TW); Chi-Wen Lin, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 14/327,223

(22) Filed: Jul. 9, 2014

(65) Prior Publication Data

US 2015/0226909 A1 Aug. 13, 2015

Related U.S. Application Data

(60) Provisional application No. 61/936,888, filed on Feb. 7, 2014.

(51) Int. Cl.
G02F 1/1335 (2006.01)
F21V 8/00 (2006.01)

(52) U.S. Cl.
CPC ........ *G02F 1/133536* (2013.01); *G02B 6/0038* (2013.01); *G02B 6/0023* (2013.01)

(58) Field of Classification Search
CPC .. G02B 6/0056; G02B 6/0038; G02B 6/0023; G02F 1/133615; G02F 1/133553; G02F 1/133536
See application file for complete search history.

(56) References Cited

U.S. PATENT DOCUMENTS

| 2002/0021498 | A1 | 2/2002 | Ohtaka et al. | |
|---|---|---|---|---|
| 2002/0180908 | A1* | 12/2002 | Ariyoshi | G02F 1/133615 349/113 |
| 2005/0123229 | A1* | 6/2005 | Huck | G02B 6/0056 385/11 |
| 2008/0278658 | A1* | 11/2008 | Kim | G02F 1/133528 349/63 |
| 2010/0067257 | A1* | 3/2010 | Meis | G02B 5/0841 362/624 |

(Continued)

FOREIGN PATENT DOCUMENTS

| EP | 1241402 | 9/2002 |
|---|---|---|
| JP | H11184388 | 7/1999 |
| JP | 2001215509 | 8/2001 |

(Continued)

OTHER PUBLICATIONS

"Office Action of Korea Counterpart Application", issued on Oct. 16, 2015, p. 1-p. 20.

(Continued)

*Primary Examiner* — James Dudek
(74) *Attorney, Agent, or Firm* — J.C. Patents

(57) ABSTRACT

A display module is provided. A light source is configured to provide an illumination beam. A light guide plate has a first surface, a second surface opposite to the first surface, and an incident surface connecting the first surface and the second surface. The illumination beam enters the light guide plate through the incident surface. A reflective element is connected to the light guide plate and has a plurality of first reflective surfaces inclined with respect to the second surface. A reflective display unit is capable of modulating a polarization state of the illumination beam to form a modulated beam. The second surface is disposed between the reflective display unit and the first surface. The first surface is disposed between the second surface and a reflective polarizer, and the reflective polarizer filters the modulated beam into an image beam.

32 Claims, 7 Drawing Sheets

(56) References Cited

U.S. PATENT DOCUMENTS

| | | | |
|---|---|---|---|
| 2010/0157200 A1* | 6/2010 | Mun | .............. G02B 6/0056 349/65 |
| 2012/0047715 A1 | 3/2012 | Chui et al. | |

FOREIGN PATENT DOCUMENTS

| | | |
|---|---|---|
| JP | 2002268061 | 9/2002 |
| JP | 2002277615 | 9/2002 |
| JP | 2005521197 | 7/2005 |
| JP | 2011175299 | 9/2011 |
| KR | 20080099083 | 11/2008 |
| WO | 03078892 | 9/2003 |

OTHER PUBLICATIONS

"Office Action of Japan Counterpart Application," issued on Nov. 4, 2015, p. 1-p. 5.

"Office Action of European Counterpart Application," issued on Nov. 6, 2015, p. 1-p. 12.

* cited by examiner

DISPLAY MODULE AND LIGHT GUIDE DEVICE

CROSS-REFERENCE TO RELATED APPLICATION

This application claims the priority benefits of U.S. provisional application Ser. No. 61/936,888, filed on Feb. 7, 2014. The entirety of the above-mentioned patent applications is hereby incorporated by reference herein and made a part of this specification.

BACKGROUND OF THE INVENTION

1. Field of the Invention

The invention relates to a display module and a light guide device.

2. Description of Related Art

In the display region of a display device, various types of spatial light modulators are applied to convert an illumination beam into an image beam, for example, transmissive liquid crystal display (LCD) panels, liquid-crystal-on-silicon (LCOS) panels, or digital micro-mirror devices (DMDs). The light efficiency of a transmissive LCD panel is less than that of a LCOS panel, and the cost of a DMD is greater than that of a LCOS panel.

Generally, in a projector using the LCOS panel, an s-polarized beam is reflected by a polarizing beam splitter (PBS) to the LCOS panel. Then, the LCOS panel modulates the s-polarized beam into a polarized beam with other polarization states, and reflects the polarized beam to the PBS. The PBS filters the polarized beam into an image beam, which is then transmitted to an image-forming lens. Finally, the image-forming lens projects the image beam onto a screen to form an image on the screen or forms a virtual image in the air or on any other virtual image plane.

In the projector using the LCOS panel, the beam splitting plane of the PBS is continuous and inclined with respect to the LCOS panel by about 45 degrees, so that the PBS occupies a large space between the LCOS panel and the image-forming lens. As a result, the distance between the image-forming lens and the LCOS panel is long, so that the projector is thick and bulky.

SUMMARY OF THE INVENTION

The invention is directed to a display module, which has a smaller thickness, high contrast ratio, and high light efficiency.

The invention is directed to a light guide device, which may effectively guide a light beam and have high light efficiency.

An embodiment of the invention provides a display module including at least one light source, a light guide plate, a reflective element a reflective display unit, and a reflective polarizer. The at least one light source is configured to provide at least one illumination beam. The light guide plate has a first surface, a second surface opposite to the first surface, and at least one incident surface connecting the first surface and the second surface. The illumination beam enters the light guide plate through the incident surface. The reflective element is connected to the light guide plate and configured to change a propagation direction of at least one part of the illumination beam. The reflective element has a plurality of first reflective surfaces inclined with respect to the second surface. The reflective display unit is capable of modulating a polarization state of the illumination beam to form a modulated beam. The second surface is disposed between the reflective display unit and the first surface. The first surface is disposed between the second surface and the reflective polarizer. The reflective polarizer filters the modulated beam into an image beam.

An embodiment of the invention provides a light guide device including a light guide plate and a reflective element. The light guide plate has a first surface, a second surface opposite to the first surface, and at least one incident surface connecting the first surface and the second surface. At least one light beam enters the light guide plate through the at least one incident surface. The reflective element is connected to the light guide plate and configured to change a propagation direction of at least one part of the illumination beam. The reflective element has a plurality of first reflective surfaces inclined with respect to the second surface.

In view of the above, in the display module according to the embodiment of the invention, the light guide plate, the reflective element, and the reflective polarizer are configured to guide the illumination beam to the reflective display unit. Since the light guide plate has a smaller thickness, the display module has smaller thickness and volume. Moreover, in the light guide device according to the embodiment of the invention, since the reflective element is configured to change a propagation direction of the light beam, the light guide device may effectively guide a light beam.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
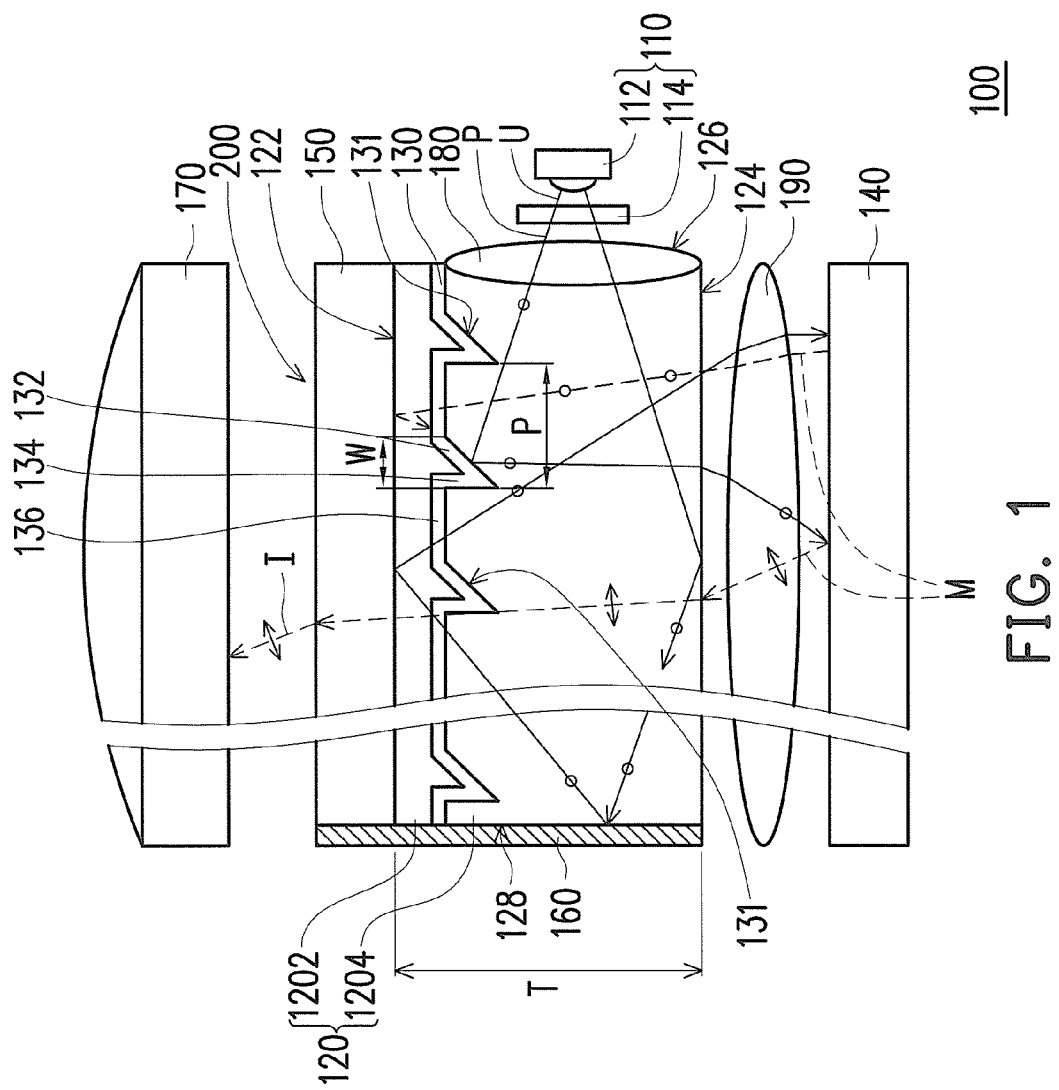
FIG. 1 is a schematic cross-sectional view of a display module according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic cross-sectional view of a display module according to an embodiment of the invention. Referring to FIG. 1, the display module 100 in this embodiment includes at least one light source 110 (one light source 110 is exemplarily shown in FIG. 1), a light guide plate 120, a reflective element 130, a reflective display unit 140, and a reflective polarizer 150. The light source 110 is configured to provide an illumination beam P, i.e. a light beam. In this embodiment, the light source 110 includes at least one light-emitting device 112 (one light-emitting device is exemplarily shown in FIG. 1) and a polarizer 114. The light-emitting device 112 is configured to emit an unpolarized beam U. The polarizer 114 is disposed on the path of the unpolarized beam U and configured to filter the unpolarized beam U into a polarized beam, wherein the illumination beam P is the polarized beam. In detail, the polarizer 114 is a reflective polarizer which allows a portion of the unpolarized beam U having a first polarization direction to penetrate through and reflects another portion of the unpolarized beam U having a second polarization direction back to the light-emitting device 112. The polarizer 114 may be a dual brightness enhancement film (DBEF) or any other reflective polarizer. However, in other embodiments, the polarizer 114 may be an absorptive polarizer which allows the portion of the unpolarized beam U having the first polarization direction to penetrate through and absorbs the portion of the unpolarized beam U having the second polarization direction. In this embodiment, the first polarization direction is perpendicular to the second polarization direction. In other embodiments, the light source 110 may not include the polarizer 114 and the light source 110 provides an unpolarized beam; that is, the illumination beam P may be the unpolarized beam. However, in other embodiments, the light source 110 may be a polarized light source, e.g. a laser light source, and the illumination beam P is a polarized beam, and the light source 110 does not include the polarizer 114.

In this embodiment, the light-emitting device 112 is a light-emitting diode (LED), for example, a white LED. The white LED may have a blue LED chip configured to emit blue light and an encapsulant wrapping the blue LED. When the blue light excites the phosphor in the encapsulant, the phosphor may convert the blue light into a yellow light. The unconverted blue light and the yellow light combine to form a white light, i.e. the unpolarized beam U. However, in other embodiments, the light source 110 may include a plurality of light-emitting devices emitting lights of a plurality of colors, e.g. primary colors. For example, the light source 110 may include a red LED, a green LED, and a blue LED which are configured to emit a red light, a green light, and a blue light, respectively. A portion (e.g. the blue portion) of the unpolarized beam having the second polarization direction and reflected by the polarizer 114 may excite the phosphor (e.g. the yellow phosphor) in the encapsulant of the LED, so as to achieve light recycling and improve the light efficiency of the light source 110. In still other embodiments, the light source 110 may include laser emitters, e.g. laser diodes, which respectively emit laser lights with a plurality of colors to form the illumination beam P.

The light guide plate 120 has a first surface 122, a second surface 124 opposite to the first surface 122, and at least one incident surface 126 (one incident surface is exemplarily shown in FIG. 1) connecting the first surface 122 and the second surface 124. The illumination beam P enters the light guide plate 120 through the incident surface 126.

In this embodiment, the first surface 122 is an interface of a first medium (i.e. the material of the light guide plate 120) inside the light guide plate 120 and a second medium (e.g. air) outside the light guide plate 120, and the refractive index of the first medium is greater than that of the second medium. Moreover, in this embodiment, the second surface 124 is an interface of the first medium (i.e. the material of the light guide plate 120) inside the light guide plate 120 and a third medium (e.g. air) outside the light guide plate 120, and the refractive index of the first medium is greater than that of the third medium. As a result, the illumination beam P from the incident surface 126 may be totally internally reflected by the first surface 122 and the second surface 126 repeatedly, so that the illumination beam P may be transmitted to a third surface 128 which is opposite to the incident surface 126 and connects the first surface 122 and the second surface 124.

The reflective element 130 is connected to the light guide plate 120 and configured to change the propagation direction of the illumination beam P. The reflective element 130 has a plurality of reflective surfaces 131 inclined with respect to the second surface 124. In this embodiment, the reflective element 130 includes a plurality of first inclined portions 132, a plurality of connecting portions 134, a plurality of top connecting portions 136. The first inclined portions 132 respectively have the first reflective surfaces 131. The connecting portions 134 are respectively connected to the first inclined portions 132, wherein each of the connecting portions 134 and the corresponding one of the first inclined portions 132 form a V-shape. Each of the top connecting portions 136 connects the top end of one of the connecting portions 134 and the top end of one of the first inclined portions 132 and is between two adjacent V-shapes.

In this embodiment, the reflective element 130 is a polarizing beam splitter (PBS) film, and the first inclined portions 132 reflect at least one part of the illumination beam P having the first polarization direction from the incident surface 126. Moreover, in this embodiment, the first inclined portions 132 and the connecting portions (each includes a connecting portion 134 and a top connecting portion 136) are connected alternately. The PBS film allows light having the first polarization direction and about perpendicularly incident on the PBS film to pass through and allows light having a second polarization direction and about perpendicularly incident (e.g. with an incident angle less than 40 degree) on the PBS film to pass through. In this embodiment, the first polarization direction is substantially parallel to the second surface 124 and the first reflective surfaces 131, and the second polarization direction is substantially perpendicular to the first polarization direction. That is, the first polarization direction is an s-polarization, and the second polarization direction is a p-polarization.

In this embodiment, when an s-polarized light is obliquely incident on the PBS film by a larger incident angle, e.g. greater than 40 degrees, the PBS film reflects the s-polarized light. When a p-polarized light is obliquely incident on the PBS film by a larger incident angle, e.g., greater than 40 degrees, the PBS film reflects the p-polarized light. However, when the incident angle is smaller, e.g., less than 40 degree, both the p-polarized light and the s-polarized light penetrate through the PBS film.

The second surface 124 is disposed between the reflective display unit 140 and the first surface 122. When the illumination beam P from the incident surface 126 is obliquely incident on the first inclined portions 132, since the illumination beam P is an s-polarized beam, the first inclined portions 132 changes the propagation direction of the illumination beam P, e.g., reflecting at least a part of the illumination beam P to the reflective display unit 140 through the second surface 124. Since the propagation direction of the illumination beam P is changed, a part of the illumination beam P may be incident on the second surface 124 with an angle less than the critical angle. Consequently, the illumination beam P reflected by the first inclined portions 132 may penetrate through the second surface 124.

The first surface 122 is disposed between the second surface 124 and the reflective polarizer 150. In this embodiment, the reflective polarizer 150 reflects a light with the first polarization direction (e.g. the s-polarized light), and allows a light with the second polarization direction (e.g. the p-polarized light) to penetrate through. Since the illumination beam P from the incident surface 126 has the first polarization direction, the illumination beam P not reflected by the first inclined portions 132 and penetrating through the connecting portions (which may include the connecting portions 134 and the top connecting portions 136) and the first surface 122 is reflected by the reflective polarizer 150 back to the first surface 122 and then transmitted in the light guide plate 120.

The illumination beam P reflected by the reflective polarizer 150 may penetrate through the first surface 122 and the second surface 124 in sequence to reach the reflective display unit 140.

In this embodiment, although the reflective polarizer 150 is disposed on the first surface 122, there may be an air gap between the reflective polarizer 150 and the first surface 122. As a result, the first surface 122 may be the interface between air and the material of the light guide plate 120.

In this embodiment, the display module 100 further includes a reflector 160 disposed on the third surface 128. The reflector 160 reflects a part of the illumination beam P not penetrating the second surface 124, so that the part of the illumination beam P may be still transmitted in the light guide plate 120. As a result, the probability of the illumination beam P reflected by the first inclined portions 132, penetrating through the second surface 124, and reaching the reflective display unit 140 is increased. Therefore, the light efficiency and uniformity of the display module 100 is improved.

The reflective display unit 140 is capable of modulating the polarization state of the illumination beam P to form a modulated beam M. The reflective display unit 140 may be a micro-display. In this embodiment, the reflective display unit 140 is a liquid-crystal-on-silicon (LCOS) panel configured to modulate and reflect the illumination beam P. For example, at least a part of the illumination beam P may be modulated from the s-polarized beam to a p-polarized beam, a beam with a circular or elliptic polarization state, or the illumination beam P is not modulated and kept to be an s-polarized beam. In other words, the modulated beam M may include an s-polarized beam, a p-polarized beam, a circularly polarized beam, an elliptically polarized beam, or any combination thereof. In other embodiments, the reflective unit 140 may be a micro-electromechanical system (MEMS) display, for example, a digital micro-mirror device (DMD).

The reflective polarizer 150 filters the modulated beam M into an image beam I. In this embodiment, the reflective polarizer 150 allows the part of the modulated beam M with the second polarization direction, e.g. the p-polarization, to penetrate through, and reflects the part of the modulated beam M with the first polarization direction, e.g. the s-polarization. Consequently, the part of the modulated beam M with the second polarization direction penetrating through the reflective polarizer 150 forms the image beam I. Since the incident angle of the modulated beam M incident on the top connecting portions 136 is smaller (e.g. less than 40 degrees), both the s-polarized portion and the p-polarized portion of the modulated beam M penetrates through the top connecting portions 136. Moreover, the p-polarized portion of the modulated beam M penetrates through the first inclined portions 132. Since the image beam I is p-polarized, and since the p-polarized light can penetrate through the reflective element 130, the reflective element 130 does not adversely affect the imaging of the display module 100. As a result, the contrast ratio and light efficiency of the display module 100 are improved, and the ghosting issue of the image is solved.

In this embodiment, the display module 100 further includes an image-forming lens 170 disposed on the path of the image beam I from the reflective polarizer 150 to form a real image on a screen or a virtual image in the air or on any other virtual image plane. If the image-forming lens 170 forms the real image on the screen, the display module 100 is a real image projector. If the image-forming lens forms a virtual image in the air or on any other virtual image plane, the display module 100 is a virtual image display, e.g. a head-mounted display (HMD) or a head-up display (HUD). When all portions of the modulated beam M have the second polarization direction, the real image or the virtual image forms a white frame. When all portions of the modulated beam M have the first polarization direction, the real image or the virtual image forms a black frame. If the portions of the modulated beam have various polarization states, for example, a circular polarization state, an elliptic polarization state, a p-polarization state, and an s-polarization state, then various proportions of the modulated beam penetrates the reflective polarizer 150 at different positions thereof, so that an image frame is formed.

In the display module 100 according to this embodiment, the light guide plate 120, the reflective element 130, and the reflective polarizer 150 are configured to guide the illumination beam P to the reflective display unit 140. Compared with a polarizing beam splitter (PBS), the light guide plate has a smaller thickness, so that the display module has smaller thickness and volume. That is, the display module 100 may have an ultra-thin profile. As a result, the volume of the HMD, HUD or projector may be effectively reduced. In an embodiment, the thickness T of the light guide plate 120 may be smaller than 10 millimeters.

In this embodiment, the display module 100 further includes a light coupling optic 180 disposed on the incident surface 126 and configured to collect the illumination beam P from the light source 110. The light coupling optic 180 may be a lens, e.g. a convex lens, or a curved surface, e.g. a convex surface. In this embodiment, the light guide plate 120, the reflective element 130, the reflector 160, the light coupling optic 180, and the reflective polarizer 150 may form a light guide device.

In this embodiment, the display module 100 further includes a focusing lens 190 disposed on the path of the image beam I between the reflective display unit 140 and the second surface 124. In another embodiment, the focusing lens 190 may be not used to further reduce the thickness of the display module 100.

In this embodiment, the reflective element 130 is a multi-layer film, and the material of the reflective element 130 includes titanium oxide (e.g. $TiO_2$ or $Ti_3O_5$), tantalum oxide (e.g. $Ta_2O_5$), silicon oxide (e.g. $SiO_2$), aluminum oxide (e.g. $Al_2O_3$), magnesium oxide (MgO), or a combination thereof. In this embodiment, the multilayer film has 2-100 layers, and the thickness of each of the layers ranges from 10 nm to 1 μm. However, in other embodiments, the reflective element 130 may be a metal layer, for example, an aluminum (Al) or silver (Ag) layer. Moreover, in this embodiment, the reflective element satisfies 0.5 μm≤W<P≤100 μm, where W is the width of each of the first reflective surfaces 131, and P is the pitch of each of the first reflective surfaces 131. In addition, in this embodiment, the first reflective surfaces 131 are inclined with respect to the second surface by 25 degrees to 60 degrees.

In this embodiment, the light guide plate 120 includes a first light guide sub-plate 1202 having the first surface 122 and a second light guide sub-plate 1204 having the second surface 124, and the reflective element 130 is sandwiched between the first light guide sub-plate 1202 and the second light guide sub-plate 1204 and is located between the first surface 122 and the second surface 124. In this embodiment, the material of the light guide plate 120 is a transparent material, e.g., plastic or glass.

Moreover, the light guide plate 120, the reflective polarizer 150, the reflective element 130, and the reflector 160 form a light guide device 200.

Figure 2:
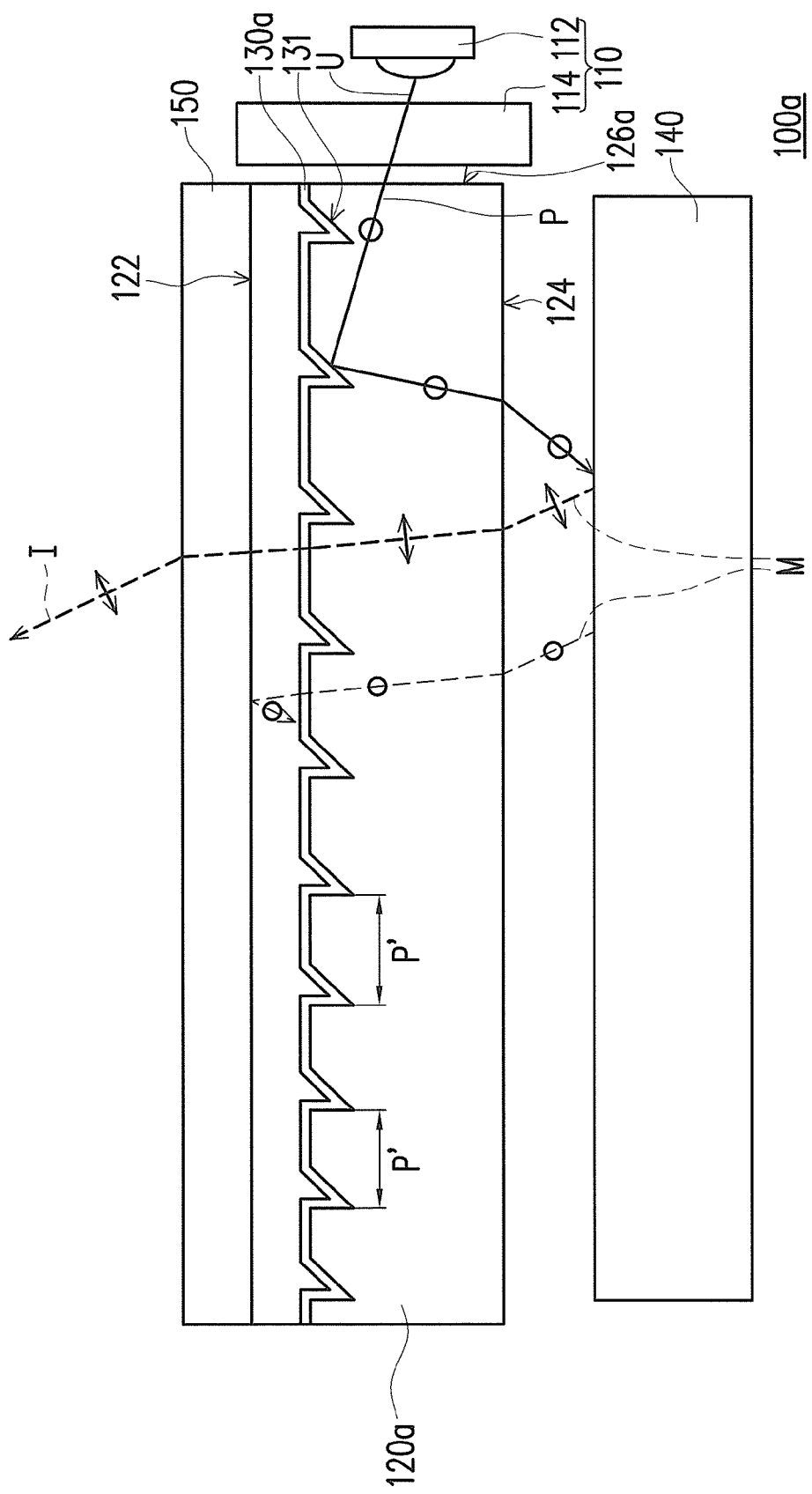
FIG. 2 is a schematic cross-sectional view of a display module according to another embodiment of the invention.

FIG. 2 is a schematic cross-sectional view of a display module according to another embodiment of the invention. Referring to FIG. 2, the display module 100a in this embodiment is similar to the display module 100 in FIG. 1, and the main difference therebetween is as follows. In this embodiment, the pitch P' of the first reflective surfaces 131 gradually decreases along a direction away from the incident surface 126a (i.e. the left direction in FIG. 2). Since the light energy density of the illumination beam P decreases along the direction, the light energy density is smaller at the end of the light guide plate 120a away from the incident surface 126a. As a result, denser first reflective surfaces 131 can reflect more illumination beam P, so that the illumination beam P incident on the reflective display unit 140 is uniform. Moreover, in this embodiment, the incident surface 126a is a plane surface.

Figure 3:
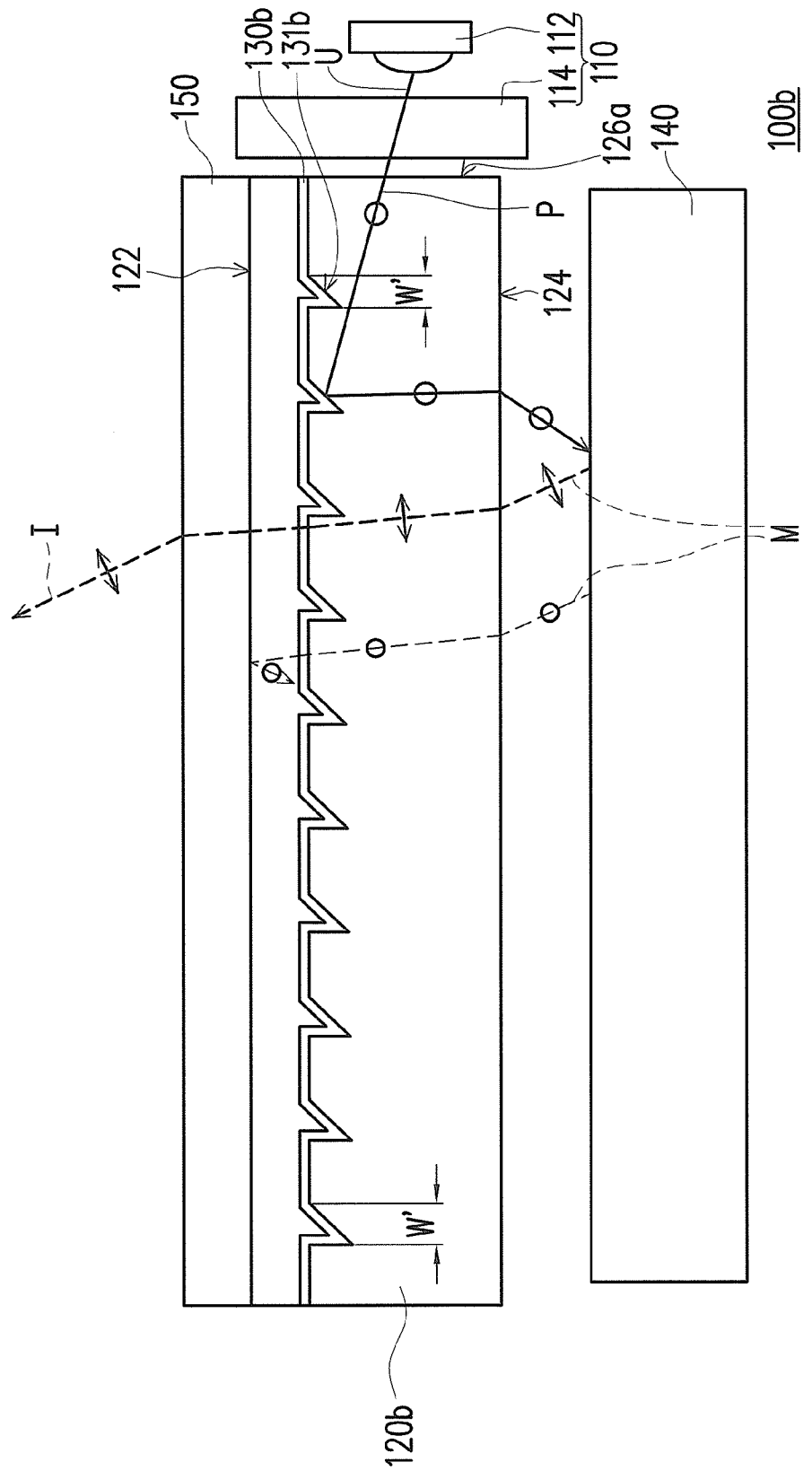
FIG. 3 is a schematic cross-sectional view of a display module according to another embodiment of the invention.

FIG. 3 is a schematic cross-sectional view of a display module according to another embodiment of the invention. Referring to FIG. 3, the display module 100b in this embodiment is similar to the display module 100 in FIG. 1, and the main difference therebetween is as follows. In this embodiment, the width W' of the first reflective surfaces 131 gradually increases along a direction away from the incident surface 126a (i.e. the left direction in FIG. 3). Since the light energy density of the illumination beam P decreases along the direction, the light energy density is smaller at the end of the light guide plate 120b away from the incident surface 126a. As a result, larger first reflective surfaces 131 can reflect more illumination beam P, so that the illumination beam P incident on the reflective display unit 140 is uniform.

Figure 4:
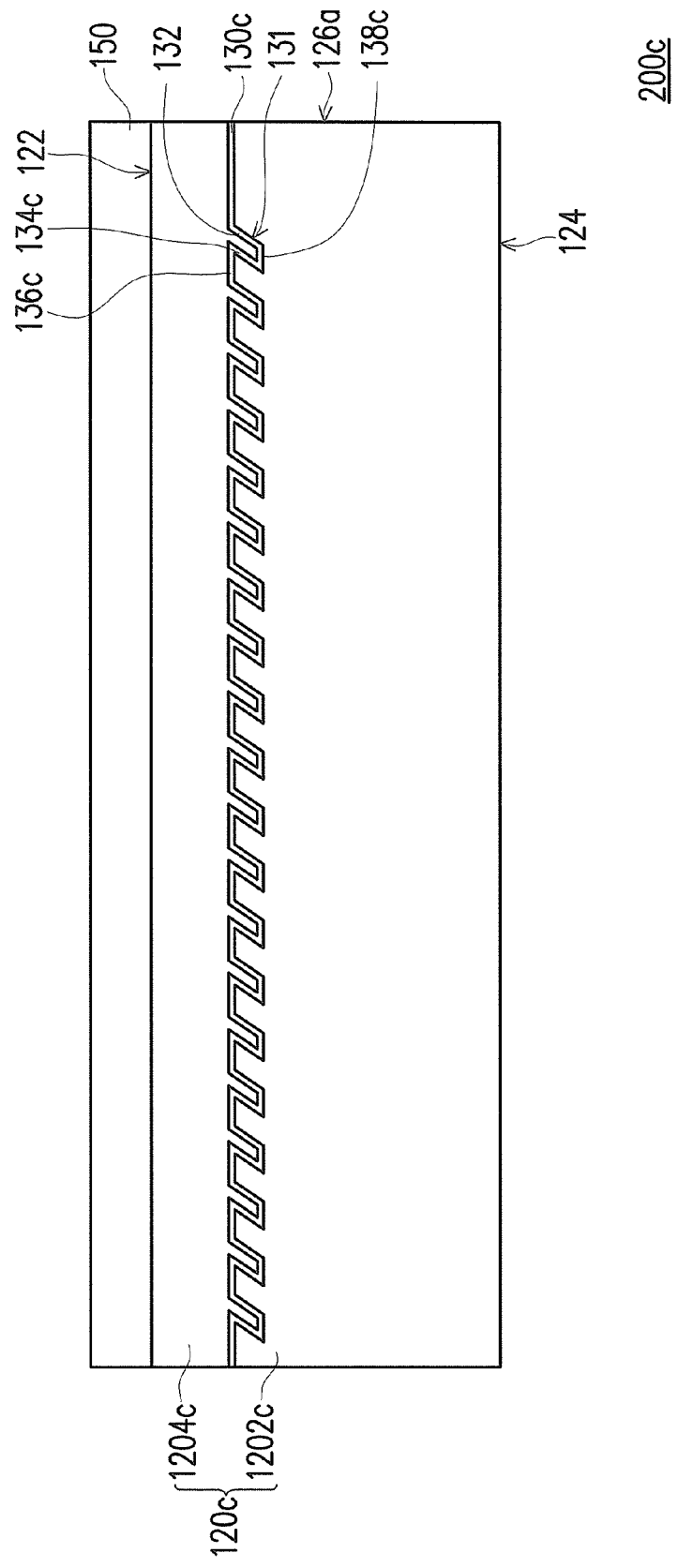
FIG. 4 is a schematic cross-sectional view of a light guide device according to another embodiment of the invention.

FIG. 4 is a schematic cross-sectional view of a light guide device according to another embodiment of the invention. Referring to FIG. 4, the light guide device 200c in this embodiment is similar to the light guide device 200 in FIG. 1, and the main difference therebetween is as follows. In the light guide device 200c, the reflective element 130c further includes a plurality of second inclined portions 134c and a plurality of bottom connecting portions 138c. The second inclined portions 134c is inclined with respect to the second surface 124, wherein the first inclined portions 132 and the second inclined portions 134c are arranged alternately. In this embodiment, the first inclined portions 132 and the second inclined portions 134c may be substantially parallel to each other.

Each of the top connecting portions 136c connects the top end of one of the first inclined portions 132 and the top end of one of the second inclined portions 134c which are adjacent to each other. Each of the bottom connecting portions 138c connects the bottom end of one of the first inclined portions 132 and the bottom end of one of the second inclined portions 134c which are adjacent to each other. Moreover, the top connecting portions 136c and the bottom connecting portions 138c are connected alternately.

Moreover, the reflective element 130c is sandwiched between a light guide sub-plate 1204c and a light guide sub-plate 1202c of the light guide plate 120c.

Figure 5:
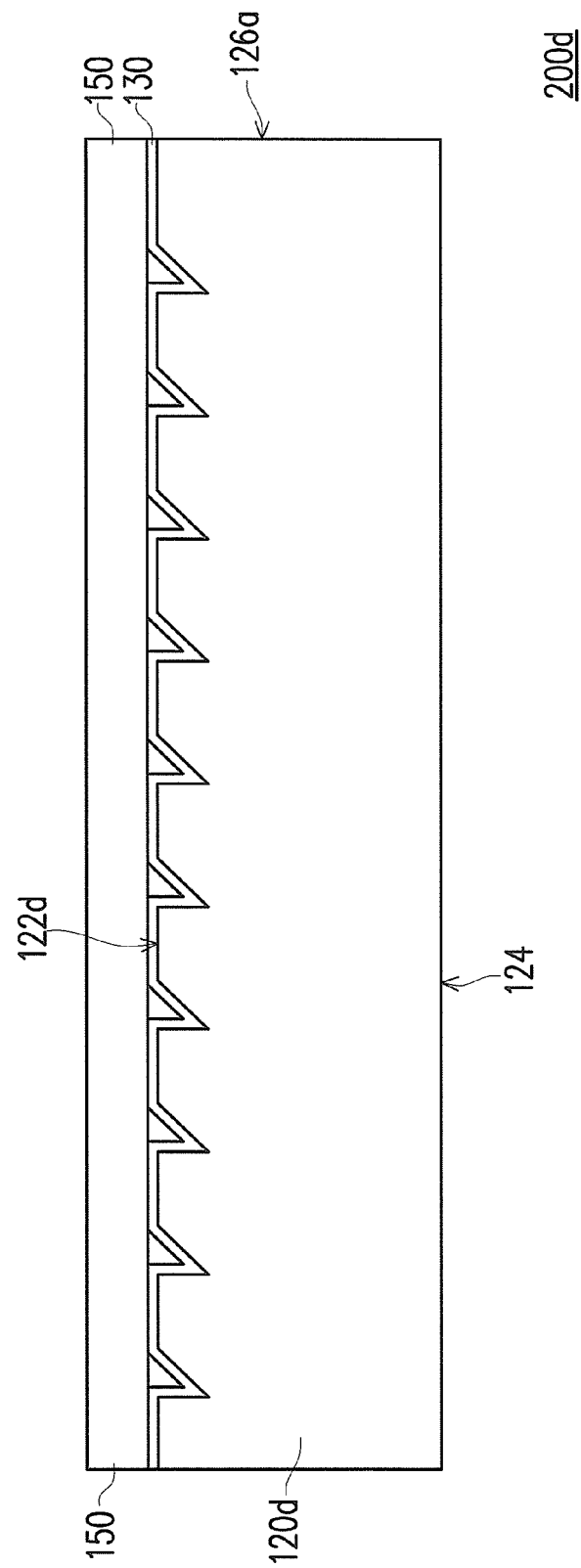
FIG. 5 is a schematic cross-sectional view of a light guide device according to another embodiment of the invention.

FIG. 5 is a schematic cross-sectional view of a light guide device according to another embodiment of the invention. Referring to FIG. 5, the light guide device 200d in this embodiment is similar to the light guide device 200 in FIG. 1, and the main difference therebetween is as follows. In the light guide device 200d, the reflective element 130 is disposed on the first surface 122d of the light guide plate 120d, wherein the light guide plate 120d is a single plate, and the reflective polarizer 150 is disposed on the reflective element 130.

Figure 6:
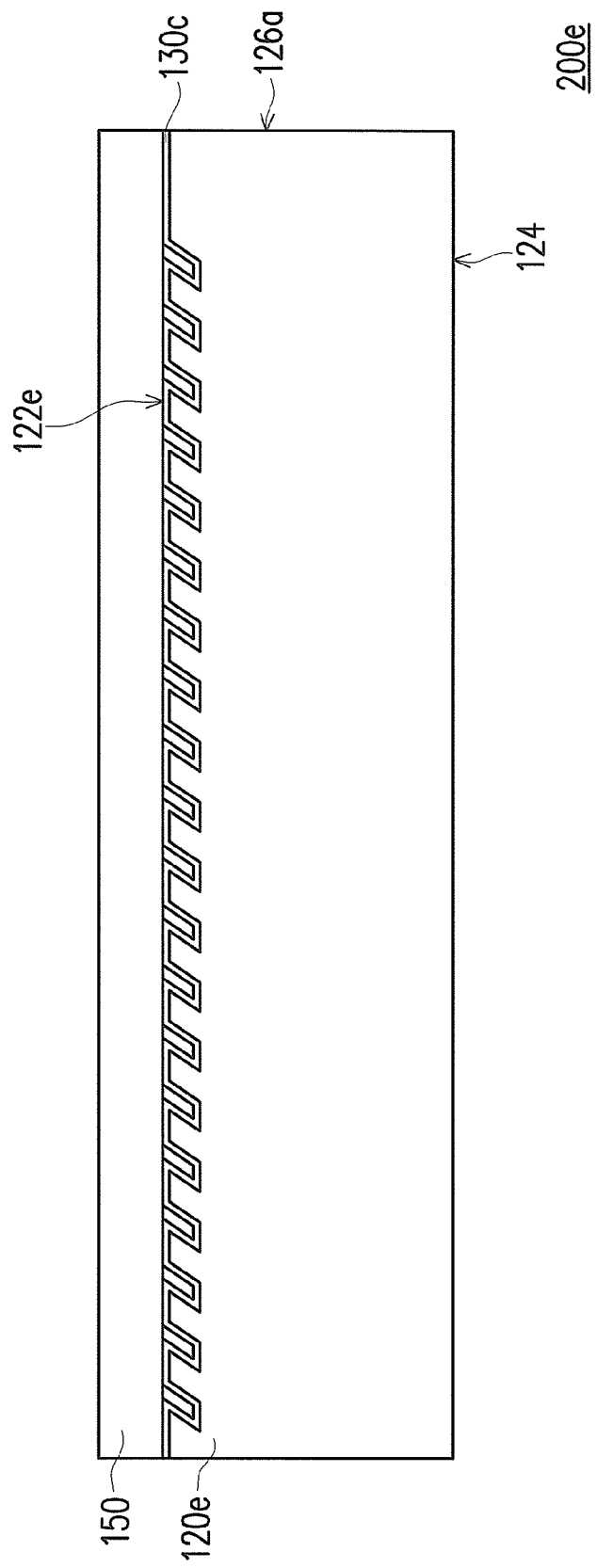
FIG. 6 is a schematic cross-sectional view of a light guide device according to another embodiment of the invention.

FIG. 6 is a schematic cross-sectional view of a light guide device according to another embodiment of the invention. Referring to FIG. 6, the light guide device 200e in this embodiment is similar to the light guide device 200c in FIG. 4, and the main difference therebetween is as follows. In the light guide device 200e, the reflective element 130c is disposed on the first surface 122e of the light guide plate 120e, wherein the light guide plate 120e is a single plate, and the reflective polarizer 150 is disposed on the reflective element 130c.

Figure 7:
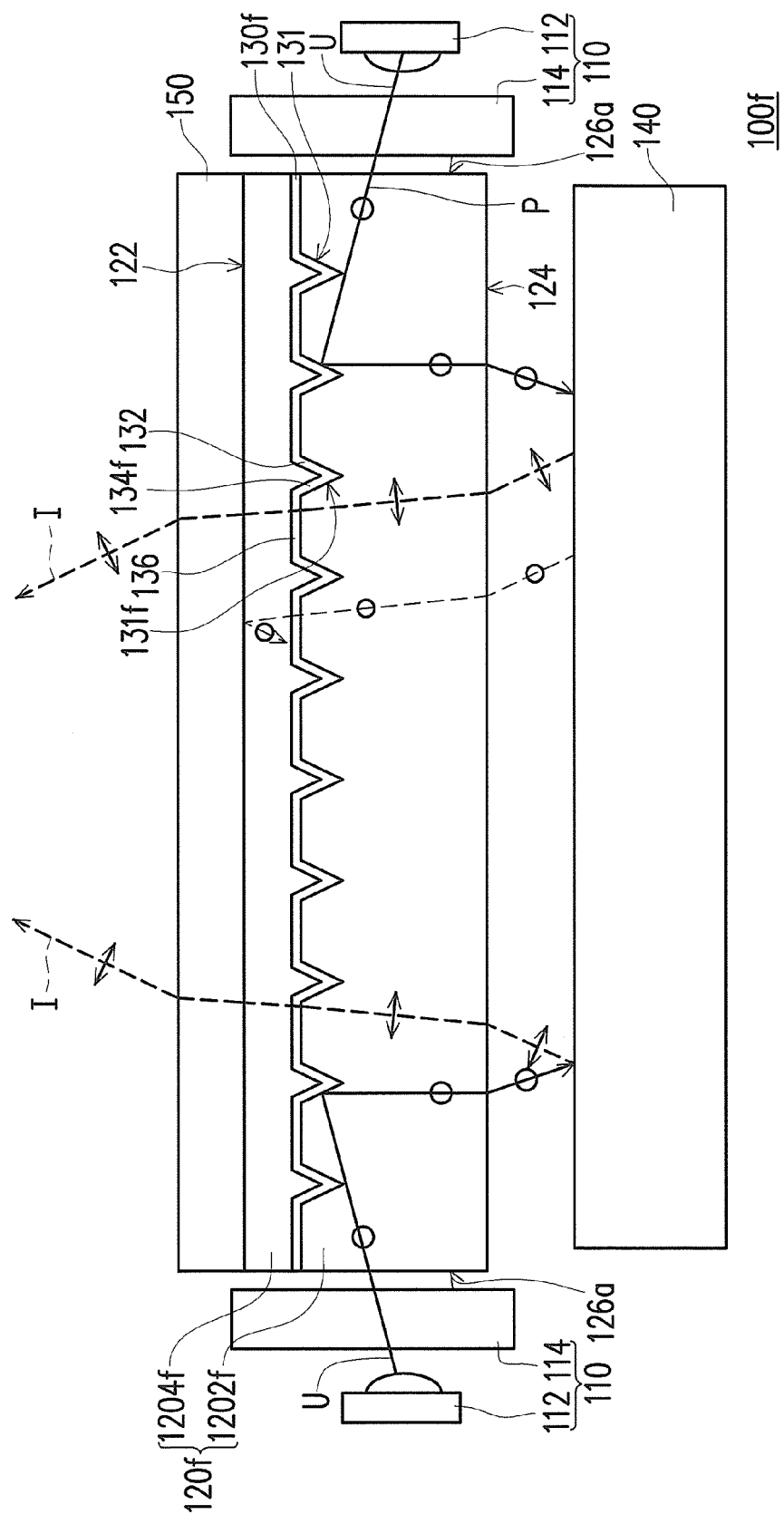
FIG. 7 is a schematic cross-sectional view of a display module according to another embodiment of the invention.

FIG. 7 is a schematic cross-sectional view of a display module according to another embodiment of the invention. Referring to FIG. 7, the display module 100f in this embodiment is similar to the display module 100 in FIG. 1, and the main difference therebetween is as follows. In the display module 100f, there are two opposite incident surfaces 126a and two light sources 110 disposed respectively beside the two opposite incident surfaces 126a. Each of the connecting portions 134f has a second reflective surfaces 131f inclined with respect to the second surface 124. The second reflective surfaces 131f can reflect the illumination beam P from the left incident surface 126a in FIG. 7.

In conclusion, in the display module according to the embodiment of the invention, the light guide plate, the reflective element, and the reflective polarizer are configured to guide the illumination beam to the reflective display unit. Since the light guide plate has a smaller thickness, the display module has smaller thickness and volume. Moreover, in the light guide device according to the embodiment of the invention, since the reflective element is configured to change a propagation direction of the light beam, the light guide device may effectively guide a light beam. Additionally, since the reflective element does not adversely affect the imaging of the display module, the contrast ratio and light efficiency of the display module are improved, and the ghosting issue of the image is solved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A display module comprising:
at least one light source configured to provide at least one illumination beam;
a light guide plate having a first surface, a second surface opposite to the first surface, and at least one incident surface connecting the first surface and the second surface, the illumination beam entering the light guide plate through the incident surface;
a reflective element connected to the light guide plate and configured to change a propagation direction of at least one part of the illumination beam, the reflective element having a plurality of first reflective surfaces inclined with respect to the second surface, wherein the reflective element is a polarizing beam splitter (PBS) film and comprises a plurality of first inclined portions configured to respectively form the first reflective surfaces, and the first inclined portions reflect at least one part of the illumination beam having a first polarization direction from the incident surface;
a reflective display unit capable of modulating a polarization state of the illumination beam to form a modulated beam, the second surface being disposed between the reflective display unit and the first surface; and a reflective polarizer, the first surface being disposed between the second surface and the reflective polarizer, the reflective polarizer filtering the modulated beam into an image beam.

2. The display module according to claim 1, wherein the reflective element further comprises a plurality of connecting portions, the first inclined portions and the connecting portions are connected alternately, the PBS film allows light having the first polarization direction and about perpendicularly incident thereon to pass through and allows light having a second polarization direction and about perpendicularly incident thereon to pass through, the first polarization direction is substantially parallel to the second surface and the first reflective surfaces, and the second polarization direction is substantially perpendicular to the first polarization direction.

3. The display module according to claim 1, wherein the reflective element is a multilayer film.

4. The display module according to claim 3, wherein a material of the reflective element comprises titanium oxide, tantalum oxide, silicon oxide, aluminum oxide, magnesium oxide, or a combination thereof.

5. The display module according to claim 3, wherein the multilayer film has 2-100 layers.

6. The display module according to claim 5, wherein a thickness of each of the layers ranges from 10 nm to 1 μm.

7. The display module according to claim 1, wherein the reflective element satisfies $0.5\ \mu m \leq W < P \leq 100\ \mu m$, where W is a width of each of the first reflective surfaces, and P is a pitch of each of the first reflective surfaces.

8. The display module according to claim 1, wherein the reflective element is disposed on the first surface of the light guide plate.

9. The display module according to claim 1, wherein the light guide plate comprises a first light guide sub-plate having the first surface and a second light guide sub-plate having the second surface, and the reflective element is sandwiched between the first light guide sub-plate and the second light guide sub-plate and is located between the first surface and the second surface.

10. The display module according to claim 1, wherein the reflective element further comprises:
a plurality of second inclined portions inclined with respect to the second surface, wherein the first inclined portions and the second inclined portions are arranged alternately;
a plurality of top connecting portions, each of the top connecting portions connects a top end of one of the first inclined portions and a top end of one of the second inclined portions which are adjacent to each other; and
a plurality of bottom connecting portions, each of the bottom connecting portions connects a bottom end of one of the first inclined portions and a bottom end of one of the second inclined portions which are adjacent to each other, wherein the top connecting portions and the bottom connecting portions are connected alternately.

11. The display module according to claim 1, wherein the reflective element further comprises:
a plurality of connecting portions respectively connected to the first inclined portions, wherein each of the connecting portions and the corresponding one of the inclined portions form a V-shape; and
a plurality of top connecting portions, each of the top connecting portions connects a top end of one of the connecting portions and a top end of one of the first inclined portions and is between two adjacent V-shapes.

12. The display module according to claim 11, wherein the at least one incident surface comprises two opposite incident surfaces, the at least one light source comprises two light sources disposed respectively beside the two opposite incident surfaces, and each of the connecting portions has a second reflective surfaces inclined with respect to the second surface.

13. The display module according to claim 1, wherein the first reflective surfaces are inclined with respect to the second surface by 25 degrees to 60 degrees.

14. The display module according to claim 1 further comprising an image-forming lens disposed on a path of the image beam from the reflective polarizer to form a real image or a virtual image.

15. The display module according to claim 1, wherein the reflective display unit is a micro-display.

16. The display module according to claim 1, wherein the light guide plate further has a third surface opposite to the incident surface, the third surface connects the first surface and the second surface, and the display module further comprises a reflector disposed on the third surface.

17. The display module according to claim 1 further comprising a light coupling optic disposed on the incident surface.

18. The display module according to claim 1, wherein the light source comprising:
at least one light-emitting device configured to emit an unpolarized beam; and
a polarizer disposed on a path of the unpolarized beam and configured to filter the unpolarized beam into a polarized beam, wherein the illumination beam is the polarized beam.

19. The display module according to claim 1, wherein the light source is a polarized light source, and the illumination beam is a polarized beam.

20. A light guide device comprising:
a light guide plate having a first surface, a second surface opposite to the first surface, and at least one incident surface connecting the first surface and the second surface, at least one light beam entering the light guide plate through the at least one incident surface; and
a reflective element connected to the light guide plate and configured to change a propagation direction of at least one part of the illumination beam, the reflective element having a plurality of first reflective surfaces inclined with respect to the second surface, wherein the reflective element is a polarizing beam splitter (PBS) film and comprises a plurality of first inclined portions configured to respectively form the first reflective surfaces, and the first inclined portions reflect at least one part of the illumination beam having a first polarization direction from the incident surface.

21. The light guide device according to claim 20 further comprising a reflective polarizer disposed on the first surface.

22. The light guide device according to claim 20, wherein the reflective element further comprises a plurality of connecting portions, the inclined portions and the connecting portions are connected alternately, the PBS film allows light having the first polarization direction and about perpendicularly incident thereon to pass through and allows light having a second polarization direction and about perpendicularly incident thereon to pass through, the first polarization direction is substantially parallel to the second surface and the first reflective surfaces, and the second polarization direction is substantially perpendicular to the first polarization direction.

23. The light guide device according to claim 20, wherein the reflective element is a multilayer film.

24. The light guide device according to claim 23, wherein a material of the reflective element comprises titanium oxide, tantalum oxide, silicon oxide, aluminum oxide, magnesium oxide, or a combination thereof.

25. The light guide device according to claim 23, wherein the multilayer film has 2-100 layers.

26. The light guide device according to claim 25, wherein a thickness of each of the layers ranges from 10 nm to 1 μm.

27. The light guide device according to claim 20, wherein the reflective element satisfies $0.5\ \mu m \leq W < P \leq 100\ \mu m$, where W is a width of each of the first reflective surfaces, and P is a pitch of each of the first reflective surfaces.

28. The light guide device according to claim 20, wherein the reflective element is disposed on the first surface of the light guide plate.

29. The light guide device according to claim 20, wherein the light guide plate comprises a first light guide sub-plate having the first surface and a second light guide sub-plate having the second surface, and the reflective element is sandwiched between the first light guide sub-plate and the second light guide sub-plate and is located between the first surface and the second surface.

30. The light guide device according to claim 20, wherein the reflective element further comprises:
   a plurality of second inclined portions inclined with respect to the second surface, wherein the first inclined portions and the second inclined portions are arranged alternately;
   a plurality of top connecting portions, each of the top connecting portions connects a top end of one of the first inclined portions and a top end of one of the second inclined portions which are adjacent to each other; and
   a plurality of bottom connecting portions, each of the bottom connecting portions connects a bottom end of one of the first inclined portions and a bottom end of one of the second inclined portions which are adjacent to each other, wherein the top connecting portions and the bottom connecting portions are connected alternately.

31. The light guide device according to claim 20, wherein the reflective element further comprises:
   a plurality of connecting portions respectively connected to the first inclined portions, wherein each of the connecting portions and the corresponding one of the inclined portions form a V-shape; and
   a plurality of top connecting portions, each of the top connecting portions connects a top end of one of the connecting portions and a top end of one of the first inclined portions in the corresponding V-shape.

32. The light guide device according to claim 31, wherein the at least one incident surface comprises two opposite incident surfaces, and each of the connecting portions has a second reflective surfaces inclined with respect to the second surface.

* * * * *